US011975585B2

(12) United States Patent
Colaw et al.

(10) Patent No.: US 11,975,585 B2
(45) Date of Patent: May 7, 2024

(54) SYSTEMS AND METHODS FOR DETECTING CHARACTERISTICS OF A MULTI-ORIENTED SURFACE

(71) Applicant: Lockheed Martin Corporation, Bethesda, MD (US)

(72) Inventors: Christopher Lee Colaw, Fort Worth, TX (US); Jose Jaime Lafon, Benbrook, TX (US); Francisco Joaquin Martinez, Fort Worth, TX (US); Andrew Timothy Modjeski, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 331 days.

(21) Appl. No.: 16/704,687

(22) Filed: Dec. 5, 2019

(65) Prior Publication Data
US 2021/0170826 A1 Jun. 10, 2021

(51) Int. Cl.
*B60G 17/0165* (2006.01)
*G05D 1/00* (2006.01)

(52) U.S. Cl.
CPC ......... *B60G 17/0165* (2013.01); *G05D 1/021* (2013.01); *B60G 2401/14* (2013.01); *B60G 2401/21* (2013.01); *B60G 2500/30* (2013.01)

(58) Field of Classification Search
USPC ........................................................ 701/23
See application file for complete search history.

(56) References Cited

U.S. PATENT DOCUMENTS

| 9,428,231 | B2 | 8/2016 | Beard et al. |
| 9,688,400 | B2 | 6/2017 | Hutson |
| 10,220,896 | B2 | 3/2019 | Kazakov |
| 10,301,017 | B2 | 5/2019 | del Castillo et al. |
| 10,331,132 | B2 | 6/2019 | Meeker et al. |
| 10,391,922 | B2 | 8/2019 | Gordon et al. |
| 2014/0230711 | A1 | 8/2014 | Lovelace et al. |
| 2015/0290800 | A1* | 10/2015 | Avigad ................ B62D 57/024 700/250 |

(Continued)

FOREIGN PATENT DOCUMENTS

| CN | 103318283 A | 9/2013 |
| CN | 106004286 A | 10/2016 |

(Continued)

OTHER PUBLICATIONS

Wancheol Myeong, Seungwon Song, and Hyun Myung, "Development of a wall-climbing drone with a rotary arm for climbing various-shaped surfaces," Jun. 26-30, 2018, https://ieeexplore.ieee.org/document/8441807 (Year: 2018).*

(Continued)

*Primary Examiner* — Maceeh Anwari
(74) *Attorney, Agent, or Firm* — Baker Botts L.L.P.

(57) ABSTRACT

According to certain embodiments, a device comprises a body, a mechanical propulsion system affixed to the body to cause the body to traverse a multi-oriented surface and to prevent contact between the body and the multi-oriented surface, a thrust system to apply a thrust force to the device that opposes a gravitational force acting on the device, and a payload with at least one sensor to detect a characteristics of the multi-oriented surface.

18 Claims, 5 Drawing Sheets

(56) References Cited

U.S. PATENT DOCUMENTS

| | | | |
|---|---|---|---|
| 2017/0274995 A1 | 9/2017 | Yamada et al. | |
| 2018/0001945 A1 | 1/2018 | Arigoni et al. | |
| 2018/0312023 A1 | 11/2018 | Braithwaite et al. | |
| 2019/0161184 A1 | 5/2019 | Arshad et al. | |
| 2019/0263206 A1 | 8/2019 | Ricotti et al. | |
| 2020/0030962 A1* | 1/2020 | Georgeson | B08B 5/04 |
| 2020/0325878 A1* | 10/2020 | Danko | B62D 57/024 |

FOREIGN PATENT DOCUMENTS

| | | | |
|---|---|---|---|
| CN | 109591903 A | | 4/2019 |
| CN | 108731736 A | * | 6/2019 |
| CN | 108731736 A | | 6/2019 |
| KR | 10-1795677 B1 | | 11/2017 |
| KR | 10-2018-0012194 | | 2/2018 |
| WO | WO 2017/219295 A1 | | 12/2017 |

OTHER PUBLICATIONS

P. Sekhar and R. S. Bhooshan, "Duct fan based wall climbing robot for concrete surface crack inspection," 2014 Annual IEEE India Conference (INDICON), 2014, pp. 1-6, https://ieeexplore.ieee.org/document/7030589 (Year: 2014).*

A. Papadimitriou, G. Andrikopoulos and G. Nikolakopoulos, "Design, Development and Experimental Evaluation of a Thrust Vectoring Vortex Climbing Robot," 2018 IEEE International Conference on Robotics and Biomimetics (ROBIO), 2018, pp. 1341-1346, https://ieeexplore.ieee.org/document/8665069 (Year: 2018).*

A. Ko, O.J. Ohanian, and P. Gelhausen, "Ducted fan UAV modeling and simulation in preliminary design," AIAA Modeling and Simulation Technologies Conference and Exhibit, 2007, pp. 1-20, https://arc.aiaa.org/doi/pdf/10.2514/6.2007-6375 (Year: 2007).*

EPO Communication regarding extended European search, Appln. 202097986-1009, dated Apr. 16, 2021.

Wancheol Myeong and Hyun Myung, Development of a Wall-Climbing Drone Capable of Vertical Soft Landing Using a Tilt-Rotor Mechanism, IEEE Access, pp. 4868-4879, Dec. 25, 2018.

"A Wall-climbing Drone Capable of Soft Landing using Tilt-rotor Mechanism", KAIST Urban Robotics Lab, https://www.youtube.com/watch?v=ioh9MVeIWas, 1 page excerpt, Aug. 7, 2018.

European Patent Office, Communication Pursuant to Article 94(3) EPC regarding Application No. 20 209 798.6-1009, dated Feb. 22, 2023.

* cited by examiner

SYSTEMS AND METHODS FOR DETECTING CHARACTERISTICS OF A MULTI-ORIENTED SURFACE

TECHNICAL FIELD

The invention relates generally to a device having thrust system for the purpose of adhering to a multi-oriented surface as the device traverses the environment.

BACKGROUND

Inspecting and operating on surfaces presents challenges to humans, particularly in confined spaces, large spaces, overhead areas, and when working on surfaces that are delicate or have pressure sensitivities. Inspection of these type of locations also presents risks to the humans that are asked to perform actions in such hazardous conditions. In some applications aerial drones may service to carry out such tasks but suffer their own limitations including a substantial risk of causing damage to the object or surface being inspected should the aerial done come into contact with the object. Aerial drones may also require special operator certifications and are restricted from use in certain airspaces.

SUMMARY OP THE DISCLOSURE

According to certain embodiments, a device comprises a body, a mechanical propulsion system affixed to the body to cause the body to traverse a multi-oriented surface and to prevent contact between the body and the multi-oriented surface, a thrust system to apply a thrust force to the device that opposes a gravitational force acting on the device, and a payload with at least one sensor to detect a characteristics of the multi-oriented surface.

According to certain embodiments a system for detecting the characteristics of a multi-oriented surface comprises at least one device, each of which comprises a body, a mechanical propulsion system affixed to the body to cause the body to traverse a multi-oriented surface and to prevent contact between the body and the multi-oriented surface, a thrust system to apply a thrust force to the device that opposes a gravitational force acting on the device, and a payload with at least one sensor to detect a characteristics of the multi-oriented surface. The system further comprises a controller to control each device and detect the characteristics of the multi-oriented surface using the sensors.

According to certain embodiments a method of detecting the characteristics of a multi-oriented surface is achieved by traversing the multi-oriented surface by at least one device, each of which comprises a body, a mechanical propulsion system affixed to the body to cause the body to traverse a multi-oriented surface and to prevent contact between the body and the multi-oriented surface, and a thrust system to apply a thrust force to the device that opposes a gravitational force acting on the device, and by then detecting characteristics of the multi-oriented surface by a number of sensors.

Certain embodiments may provide one or more technical advantages. As an example, certain embodiments provide advantages for allowing a drone to move about the surface of an object that may have a complicated topology and/or a delicate surface. As another example, certain embodiments provide advantages for enabling a drone to move about an inverted surface of an object that may be non-magnetic or may be intolerant of vacuum forces. Another example may be that certain embodiments provide the advantage of achieving better efficiency and/or ensuring complete adhesion of the drone to a partially-inverted surface through controlling the direction and point at which the thrust force acts upon the drone. Certain embodiments may include all, some, or none of the above-described advantages. Other advantages will be apparent to those of ordinary skill in the art.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
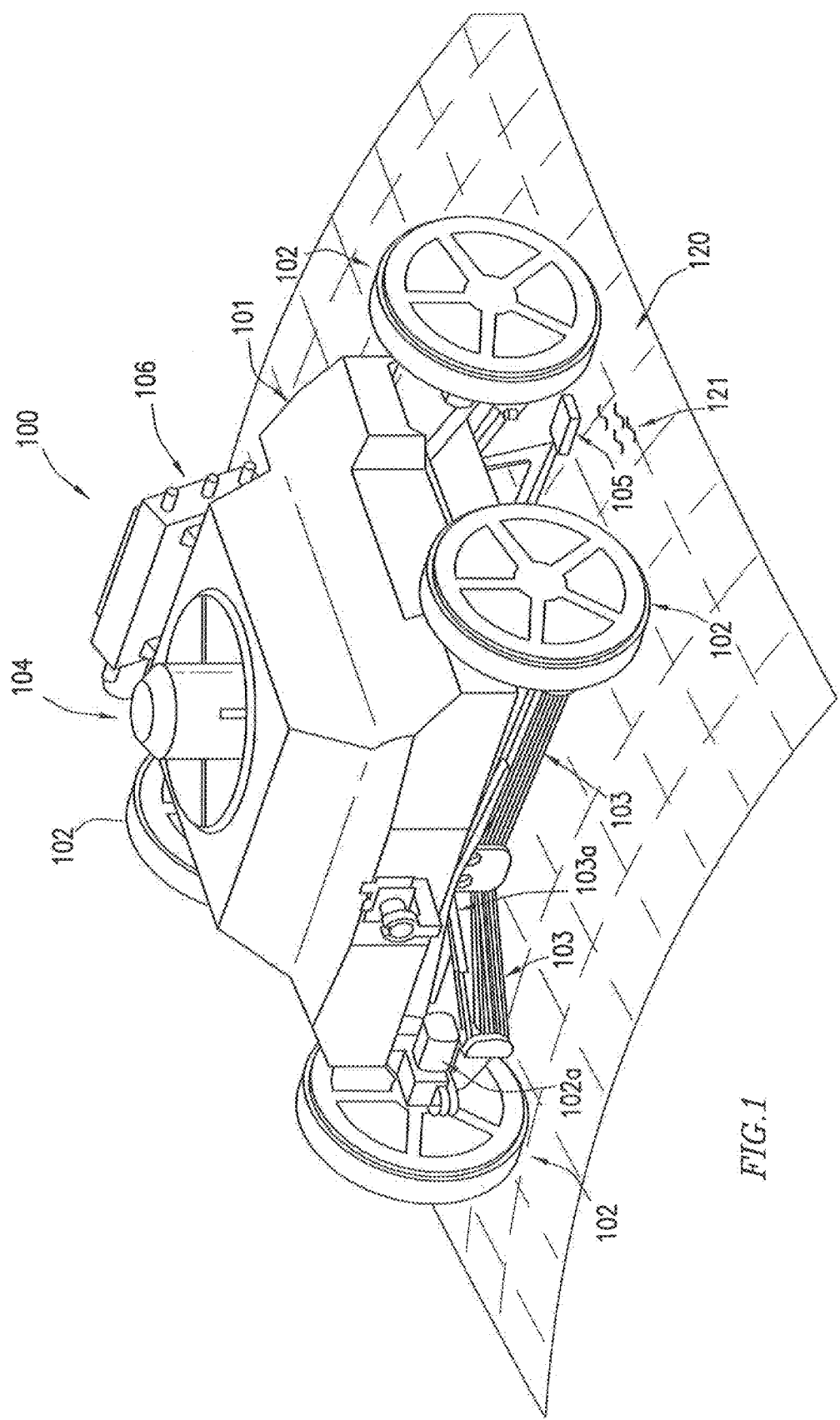
FIG. 1 illustrates an example crawler drone having a thrust system for adhering to a multi-oriented surface.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Embodiments of the present disclosure and its advantages are best understood by referring to FIGS. 1 through 5 of the drawings, like numerals being used for like and corresponding parts of the various drawings.

During manufacturing and assembly of large objects inspection and quality control may be critical, particularly for highly-sophisticated products. A large portion of this inspection and quality control is carried out by human workers. However, there may be regions of the manufactured object that are difficult to be inspected or worked on by humans. The reasons for this may range for difficult to access areas, areas that may be completely inaccessible to humans or may other wise fey confined or at great elevation requiring special certification or other precautions. These difficulties may lead to additional expense, delays, or may also present greater risk of damage to the manufactured object (e.g., where the manufactured object may be easily damaged by dropped tools). In addition to the challenges present, to human workers, better efficiencies may be achieved by employing inspection drones. The use of drones may supplement the manned-workforce. The use of drones may also be used to deploy a fleet of drones that may be coordinated to maximize efficiency. Such a fleet of drones may be deployed for use in any manner of coordination. This control and coordination may be carried out by individual control of each drone by a separate operator or controlled in groups by an operator. It is also possible to employ either semi-autonomous or completely autonomous control. Such forms of control and coordination may use pre-arranged inspection routes or inspection courses that may enable mere efficiently completion of the task.

Recently, aerial drones have become more prevalent. These aerial drones, such as quadcopter or multi-rotor drones, present certain benefits as described above by have their own set of limitations. Current aerial drones are generally not well suited for performing inspections in particular orientations and may also have difficultly transitioning between orientations. Furthermore, an aerial drone may present a greater risk of causing damage to the objected to be inspected. For example, quadcopters with exposed blades may cause significant damage to an object if the rotating blades come into contact with the surface of the object. Another drawback of aerial drones is that in particular locations they may have certain restrictions, for example. Federal Aviation Administration approval or line of sign restrictions. Of course, the rapid consumption of power reserves required to continuously suspend the aerial drone makes such aerial drones less effective for carrying out inspections where an object may have a large surface to inspect that could otherwise be accomplished beneath a drone resting on the surface. Other types of drones, such as those that use magnets or suction forces to adhere to a surface, may not be suitable for many applications. Tor instance, this mechanism of adhering to a surface would not be suitable for non-magnetic objects or objects that have a surface that is intolerant of vacuum forces (e.g., thin-film surfaces or surfaces that may be destroyed by small scrapes). A number of ether drawbacks to existing designs are also well known in the art.

FIG. 1 illustrates an example crawler drone 100 that that may be used to traverse a multi-oriented surface 120. Multi-oriented surface 120 may include a particularly challenging surface to completely traverse. For example, in the aerospace manufacturing industry a multi-oriented surface 120 may be either the internal or external surface of an aircraft fuselage, a confined fuel tank incorporated into the wing of an aircraft, or a tail vertical stabilizer that would otherwise require a human technician to use scaffolding and a harness to reach. Multi-oriented surface 120 may also be located in an environment inhospitable to humans such as an environment with extreme temperature or where contaminants and other environmental pollutants are present.

There may be a number of characteristics associated with the multi-oriented surface 120. For instance, the characteristics of the multi-oriented surface 120 may include the tensile strength, pressure rating, and magnetic properties of the multi-oriented surface 120. The characteristics of the multi-oriented surface 120 may also include, for example, one or more defects 121 in the manufacturing of the multi-oriented surface 120. As an example, defect 121 may include any form of flaw such as a surface scratch, blemish, cracks, delamination, spalling, cavities, improper welds, or other assembly flaws.

Crawler drone 100 may have a body 101 providing structure to the drone and supporting other systems of crawler drone 100. Crawler drone 100 may also have a mechanical propulsion system 102 affixed to the crawler drone 100. As illustrated, the mechanical propulsion system 102 of crawler drone 100 includes four wheels. The mechanical propulsion system 102 may include any number of wheels, continuous tracks, omni-directional ball wheels, and casters depending on the application and the characteristics of the particular multi-oriented surface 120. For instance, wheels of a greater width or tracks may be selected for a particularly delicate multi-oriented surface 120 to ensure greater distribution of the weight of crawler drone 100 or greater of the thrust force through the mechanical propulsion system 102 onto the multi-oriented surface 120. The mechanical propulsion system 102 may also include a motor 102a to turn the wheels or tracks of the crawler drone 100 to enable the crawler drone to drive or traverse the multi-oriented surface 120. The mechanical propulsion system 102 may include any number of electric motors, in the illustrated embodiment the mechanical propulsion system 102 include one electric motor 102a at each of the wheels.

The wheels or tracks of mechanical propulsion system 102 may supported by a suspension system 103. As illustrated, the suspension system 103 is integrated as part of crawler drone 100 and may be affixed to body 101. The suspension system 103 may serve to ensure that all of the wheels or a sufficient portion of the tracks of mechanical propulsion system 102 remains in contact with the multi-oriented surface 120. In certain embodiments the suspension system may have actuators 103a for the purpose of raising, lowering, or: adjusting the tilt, or orientation of the body 101 and the entire crawler drone 100 with respect to the multi-oriented surface 120. This may be done to lift the body 101 of crawler drone 100 over a protrusion of the multi-oriented surface 120 so as to ensure that the crawler drone 100 may be completely contact free as it traverses the multi-oriented surface 102, other than the contact between the mechanical propulsion system 102 and the multi-oriented surface 120. Additionally, actuators 103a may be selectively engaged to tilt the crawler drone 100. This may have particular benefits as will be described in further detail with respect to the descriptions of FIGS. 3-5.

The crawler drone 100 also includes a thrust system 104 to provide a normal force on the crawler drone 100. The normal force applied to the crawler drone 100 by the thrust system 104 may assist the crawler drone 100 in adhering to multi-oriented surface 120. When the thrust system 104 is sized correctly it may provide a sufficient normal force to ensure that the mechanical propulsion system 102 of the crawler drone 100 maintains contact with the multi-oriented surface 120 through the full range of orientations, including a completely inverted orientation. In such an instance the thrust system 104 must provide a thrust force that is greater than the gravitation force acting upon the crawler drone 100. The appropriate thrust force is further detailed with respect to the disclosure of FIG. 5 herein. It is also recognized that the thrust system 104 may also be configured so a to reduce the negative suction pressure at the bottom of the crawler drone 100 that may otherwise be problematic to the face of particularly delicate multi-oriented surfaces 120. This may be accomplished by, for example, locating the intakes for the thrust system 104 at the sides of the body 101 so as to draw in air at the sides and avoid the possibility of a vacuum occurring on the face of the multi-oriented surface 120.

As illustrated in FIG. 1 the thrust system is incorporated into body 101 but other configurations for thrust system 104 are also envisioned, for example, external rotor blades. Furthermore, in certain embodiments thrust system 104 may include more than one ducted fan, for instance four ducted fans may ail be located about the periphery of body 101 such that the power of each ducted fan may be controlled to cause a moment to act about the center of gravity of the crawler drone 100. This moment may be beneficial to cause the suspension system 103 to slump thereby resulting in the angle of the thrust force applied to the crawler drone 100 by the thrust system 104 to be slightly off from normal. In certain other embodiments, the thrust system 104 may include control vanes to adjust the angle of the thrust force. As may be appreciated, this angling of the thrust force may help to control the force applied by the mechanical propulsion system 102 to the multi-oriented surface 120 in situations where the characteristics of the multi-oriented surface 120 cannot support a large force. This angling of the thrust force may also be beneficial in assisting the mechanical propulsion system 102 in mounting an inclined portion of the multi-oriented surface. This angled thrust force will be described in further detail with respect to the descriptions associated with FIGS. 2a-3.

Crawler drone 100 also includes a payload 105 for accomplishing a host of tasks. As illustrated, crawler drone 100 has a sensor for detecting defects 121 associated with the multi-oriented surface 120. The sensor of payload 105 may be any combination of a visual-spectrum camera, an infrared camera, a thermal camera, a laser scanner, an X-ray module, an ultrasonic non-destructive testing module, or any other type of sensor for determine characteristics associated with the multi-oriented surface 120. As the crawler drone 100 traverses the multi-oriented surface 120 the sensor of payload 105 may detect a detect 121. These detected defects 121 may be captured in the recorded data or otherwise identified. For example, the crawler drone 100 may indicate the presence of the defect 121 by placing a marker on the multi-oriented surface 120 that is near the defect 121. Such markers may include an ink mark, a paint mark, a sticker, or other conceivable marker. In certain other embodiments payload 105 may also include a tool for making repairs to the defect 121 of the multi-oriented surface 120. Tools equipped to the payload 105 may include a paint applicator, a sealant applicator, a glue applicator, a sanding apparatus, a debarring apparatus, a cutting apparatus, a welding apparatus, a rivet applicator, a marker, a sticker applicator, or any other tool as may readily be apparent to one of skill in the art of manufacturing. In other embodiments, the payload 105 may also include a tool delivery system for transporting a tool to a human work, or other system to carry out the repair.

The crawler drone 100 may also include a controller 106. As illustrated, the controller 106 is mounted to the body 101 of the crawler drone 100. This configuration may be used for an autonomous crawler drone 100 but may also be used for manual or semi-autonomous control where the directions are provided to the controller 106 through wireless communication (e.g., Bluetooth, Wi-Fi, or other radio telecommunications). However, in certain other embodiments, the controller may be located remote to the crawler drone 100. For example, a tether may be communicatively coupled with the crawler drone 100 to provide direction and control to the crawler drone. Controller 106 may also have various inputs and outputs to facilitate the retrieval of data from the sensor of payload 105 (e.g., USB, MicroSD, remote media streaming, as well as other storage devices).

FIGS. 2a-2f illustrate a sequence of transitions performed by a simplified representation of a crawler drone 200, such as that illustrated in FIG. 1, as it traverses a complex multi-oriented surface 220. A number of simplified forces acting upon the crawler drone 200 are represented in each of the FIGS. 2a-2f. These forces correspond as follows: $F_T$ is the thrust force applied by the thrust system 104; $F_N$ is the effective normal force from the multi-oriented surface 220 acting upon the crawler drone 200; mg is the force of gravity acting upon the crawler drone 200; and $F_f$ is the friction force acting on the wheels of the mechanical propulsion system 102. For the four-wheeled embodiment illustrated in FIG. 1 it is understood that there would be four friction forces, and four normal forces acting along the points of contact of each of the four wheels of the mechanical propulsion system 102, however these forces have been simplified in their representations throughout FIGS. 2a-2f for clarify. Furthermore, the various forces as illustrated are not all to scale but; in combination with the following descriptions serve to inform some of the functionality of the crawler drone 200.

Figure 2A:
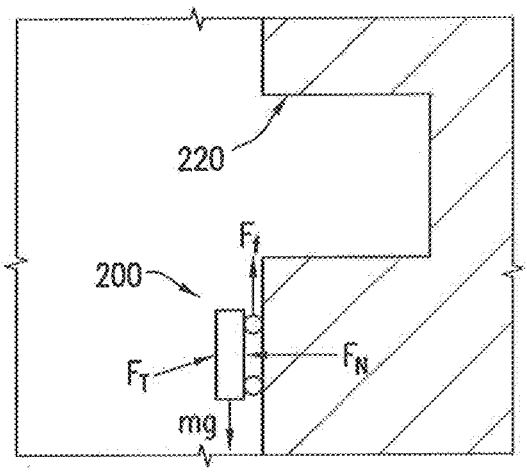
FIGS. 2a-2f illustrate a sequence of conditions under which the drone may operate as it traverses a surface having a complicated series of orientations.
Figure 2B:
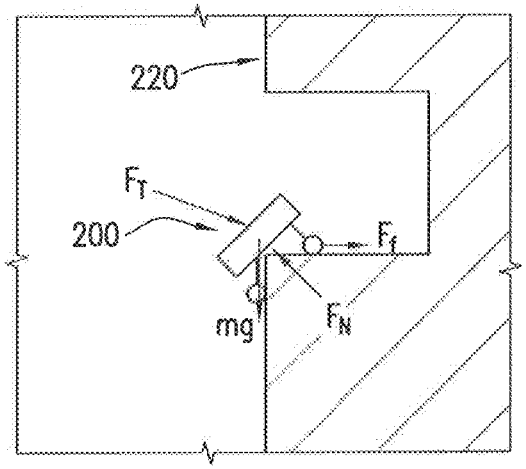

As illustrated in FIG. 2a, when the crawler drone 200 is scaling a vertically-oriented multi-oriented surface 220 the thrust force is directed towards the bottom of the multi-oriented surface that, in combination with the friction force of the mechanical propulsion system 102, causes the crawler drone 200 to adhere to the multi-oriented surface. With a sufficient thrust force from the thrust system 104, the mechanical propulsion system 102 may locomote around the multi-oriented surface 220. As illustrated in FIG. 2a the crawler 220 my traverse the vertical-portion of the multi-oriented surface in an upward direction until it reaches the position as illustrated in FIG. 2b. By slightly angling the thrust force applied to the crawler drone 200 by to the thrust system 104, the normal component of the thrust force may lessen the force applied to the multi-oriented surface 220 and the vertical component may also assist the mechanical propulsion system 102 in overcoming the gravitational force in the direction of travel.

As illustrated in FIG. 2b, the suspension system 103 may be capable of lifting the body 101 of the crawler drone 200, such as by actuators 103, above any point of the multi-oriented surface 220 to avoid any damage that might result from contact or even with placing the thrust system 104 within close proximity of the multi-oriented surface 220.

Figure 2C:
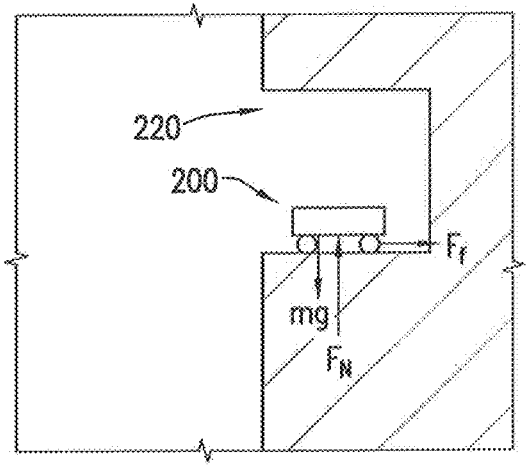

As the crawler drone 200 transitions from the vertical orientation of FIG. 2a, to an inclined orientation of FIG. 2b, then to a horizontal orientation as illustrated in FIG. 2c, the thrust force produced by the thrust system 104 may be progressively decreased until, in some embodiments, it may ultimately be completely reduced to a zero-magnitude condition once the crawler drone is on a level plane, such as illustrated in FIG. 2c. In FIG. 2c the crawler drone 200 may traverse the multi-oriented surface 200 powered entirely by the mechanical propulsion system 102. In other embodiments the crawler drone 200 may traverse the multi-oriented surface 200 by applying a thrust force by the thrust system 104 angled in the direction of travel, in such a case the friction force would act in the opposite direction as that illustrated in FIG. 2c.

Figure 2D:
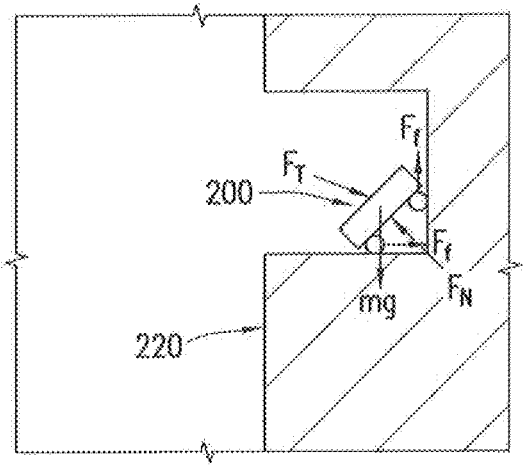

In FIG. 2d the crawler drone 200 is shown transitioning the multi-oriented surface 220 from a horizontal orientation to a vertical orientation. Here, the thrust system 104 may again need to be engaged to ensure a sufficient friction force may result at each of the points of contact of the mechanical propulsion system 102. Additionally, depending on the length of overhang between the body 101 of the crawler drone 200 and the radius of transition or curvature of the multi-oriented surface 220, the suspension system 103 may raise the body 101 or extend the mechanical propulsion system 102 to avoid contact with the multi-oriented surface 220.

Figure 2E:
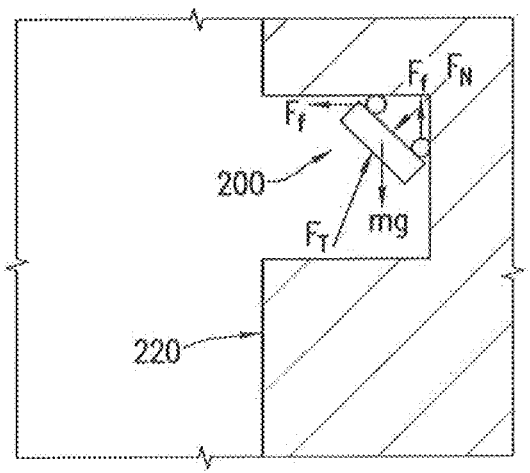

For purposes of brevity, the next orientation shown in FIG. 2d occurs after the crawler drone has transitioned through the vertical portion. Reference may be made to the description with respect to FIG. 2a for the intermediate operation of the crawler drone 200 between FIGS. 2c and 2d. In many respects, the operation of the crawler drone 200 in traversing the concave transition of FIG. 2e will be similar to that of FIG. 2d with the notable distinction that the thrust force will be greater in the partially-inverted orientation of FIG. 2e. This effect occurs because the thrust force of the thrust system 104 as oriented in FIG. 2e is opposed to the gravitational force acting on the crawler drone 200 compared with the orientation show in in FIG. 2d.

Figure 2F:
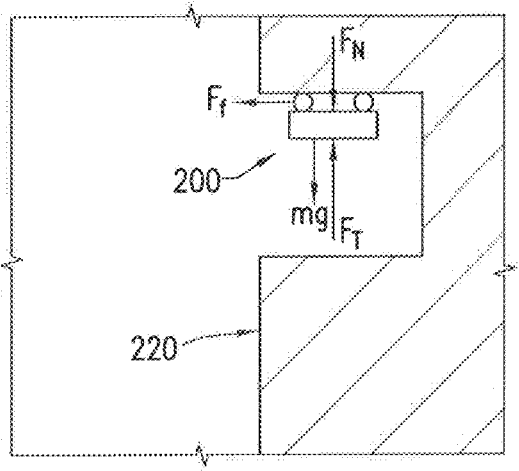

Lastly, as illustrated in FIG. 2f, the crawler drone 200 is in a completely-inverted orientation. In order to remain adhered to the multi-oriented surface 220, the thrust system 104 must produce a thrust force at least as great as the gravitational force acting on the crawler drone 200. In certain embodiments, when in the fully inverted orientation, the thrust system may be at its greatest thrust output, however, as described further with respect to FIG. 5, in certain instances this may not be the case.

Figure 3:
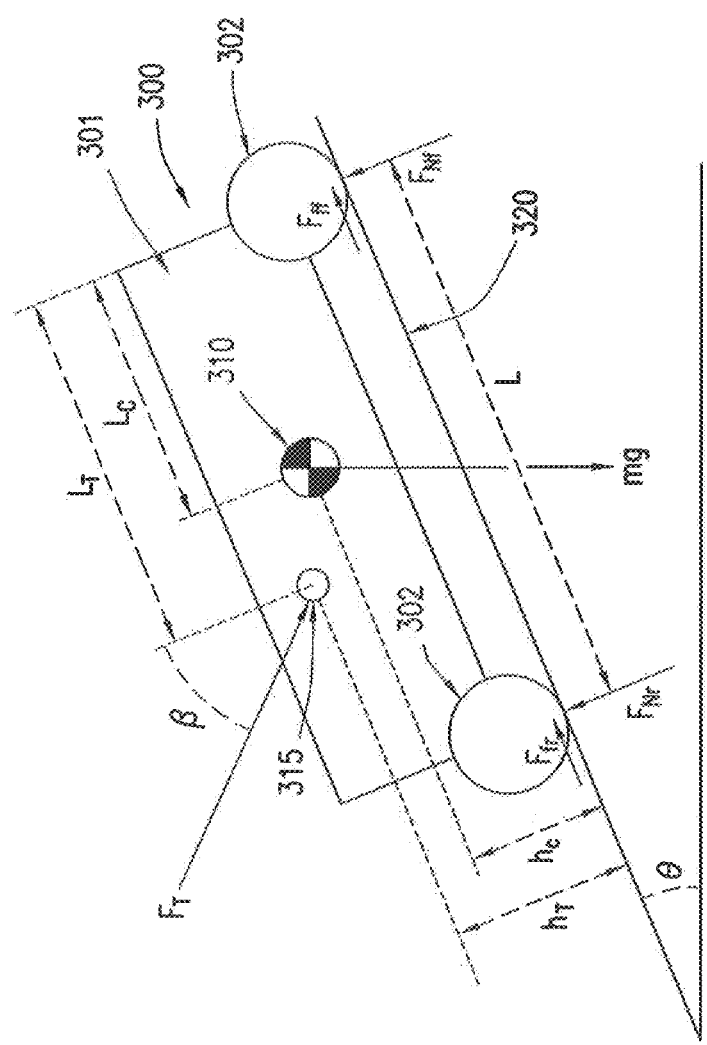
FIG. 3 illustrates a two-dimensional view of a crawler drone ascending an inclined surface with representations of the instantaneous forces acting upon the crawler.

FIG. 3 illustrates a simplified free body diagram of a crawler drone 300 moving in an ascending direction along a sloped multi-oriented surface 320. As illustrated, the crawler drone 300 has mechanical propulsion system 302 illustrated as a pair of wheels in contact with the multi-oriented surface 320. A thrust force FT is also illustrated as effectively acting upon a point 315 within body 301 of the crawler drone 300. Additionally, the center of gravity 310 of the crawler drone 300 is represented as a point. Other nomenclature illustrated include: $\theta$—The angle of slope of the multi-oriented surface 320; mg—The gravitation force acting upon the crawler drone 300; $F_T$—The thrust force produced by the thrust system 104; $\beta$—The angle of the thrust force off from normal to the multi-oriented surface 320; L—The length of the wheelbase of the mechanical propulsion system 302; $L_C$—The distance between the front of the mechanical propulsion system 302 and the center of gravity 310; $L_T$—The distance between the front of the mechanical propulsion system 302 and the point 315 upon which the thrust force acts; $h_C$—The distance from the center of gravity 310 of the crawler drone 300 to the multi-oriented surface 320; $h_T$—The distance from the point 315 upon which the thrust force acts to the multi-oriented surface 320; $F_{Nf, Nr}$—The normal force applied to the front and rear wheels of the mechanical propulsion system 302, respectively; and $F_{ff, fr}$—The frictional force applied to the front and rear wheels of the mechanical propulsion system 302, respectively.

Consideration of the distances between the point 315 and the center of gravity 310 may be used to control the rotational moment applied to the crawler drone 300. This distance from the point 315 to the center, of gravity 310 may be controlled, for example, where a thrust system 104 includes more than one ducted fan by controlling the different fan speeds to locate the point of the effective thrust; force to be closer to those fans with a greater magnitude. This moment may induce a rotational force causing the suspension system 103 to slump in response to the rotational force. The slumping of the suspension system 103 therefore causes the body 301 of the crawler drone 300 to change its angle slightly. By doing so, even for embodiments of crawler drones 300 that have a fixed angle thrust system 104 the angle $\beta$ of the thrust force may be controlled. Additionally, as previously described, the angle $\beta$ may be adjusted either by the thrust system 104, by an active suspension system 103 with actuators 103a, by the thrust system 302 in combination with the suspension system 103, or any combination thereof.

As a simple example, when the thrust force is held at a constant, as the angle $\beta$ increases the normal forces $F_{Nf, Nr}$ acting on the mechanical propulsion system 302 will decrease and the force parallel to the multi-oriented surface 320 will increase, hereinafter this parallel force that is a component of the thrust, force will be referred as a pushing force. For a range of thrust forces, there will be a corresponding angle $\beta$ such that the pushing force will equal the sliding component of the gravitational force acting on the crawler drone 300 such that the crawler drone 300 may be stable in place without rolling down the multi-oriented surface 320 having a slope of $\theta$. Either increasing the thrust force, increasing the angle $\beta$ of the thrust force for the same slope of $\theta$, or a combination thereof may cause the crawler drone 300 to move up the slope of the multi-oriented surface 320 or used in combination to assist the mechanical propulsion system 302 to traverse up the multi-oriented surface 320. Likewise, as the thrust force and the angle $\beta$ of the thrust force are decreased the sliding component, of the gravitational force may tend to cause the crawler drone 300 to roll down the multi-oriented surface 320. This may be advantageous when it is desired to descend a multi-oriented surface by allowing the gravitational force to inherently cause the crawler drone 300 to traverse down the multi-oriented surface thereby achieving a reduction in the energy expenditure by either or both of the thrust system 104 and the mechanical propulsion system 302.

Furthermore, as the angle $\theta$ of the slope of the multi-oriented surface 320 increases the angle $\beta$ of the thrust force or the magnitude of the thrust force must correspondingly increase. These effects may be better described with respect to the three-dimensional depiction of a simplified crawler drone 400 as illustrated in FIG. 4 along with the associated thrust force diagram of FIG. 5.

Figure 4:
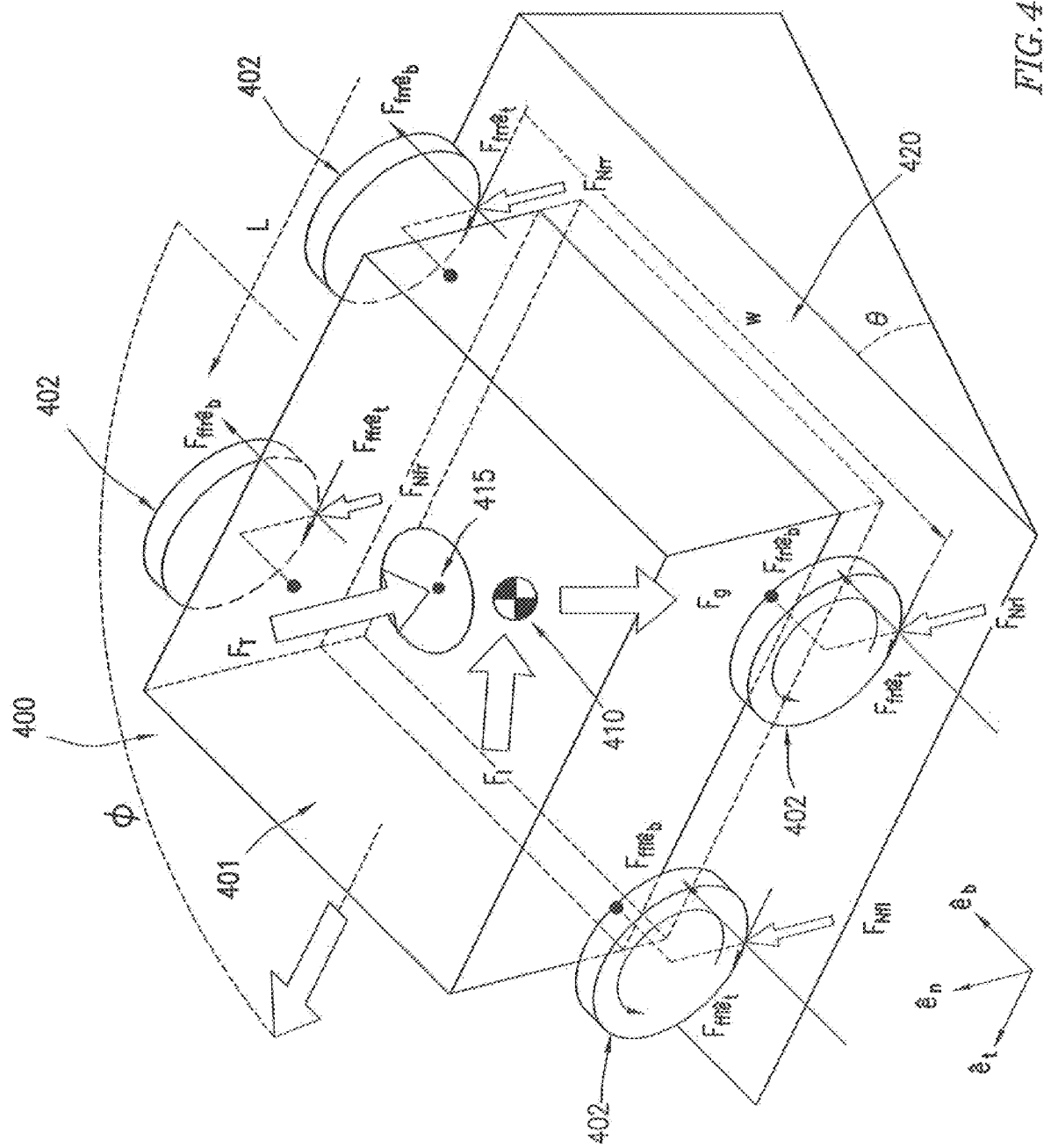
FIG. 4 illustrates a three-dimensional view of a crawler drone moving horizontally across an inclined surface with representation of the instantaneous forces acting upon the crawler.

FIG. 4 introduces some additional concepts to the simplified two-dimensional free body diagram of FIG. 3. Here, as illustrated, the crawler drone 400 has a body 401 along with a mechanical propulsion system 402, In certain embodiments the mechanical propulsion system 402 may include four wheels for traversing the multi-oriented surface 420. For the sake of clarity, those concepts introduced with respect to FIG. 3 will not be repeated here and the focus will instead be directed to concepts unique to the three-dimensional representation of the crawler drone 400 on a multi-oriented surface 420.

Vector notation has been implemented for the illustration of the crawler drone 400 in FIG. 4. In contrast to the two-dimensional representation, here the friction forces on each wheel of the mechanical propulsion system 402 there two components of the friction force illustrated as applied to each wheel. First is a friction force $F_f$ in the direction of travel $\hat{e}_t$ and second is a friction force $F_f$ perpendicular to the direction of travel $\hat{e}_b$ which accounts for the slipping force resultant from the gravitational force $F_g$ acting on the crawler drone 400. The third force acting on each of the wheels is the normal force $F_N$. Each of these three forces for the four wheels are followed by a series of letters to indicate which wheel the force corresponds to. The notation scheme is as follows: Force$_{friction\ or\ normal,\ front\ or\ rear,\ left\ or\ right,\ direction}$. For instance, the friction force $F_{ffl\hat{e}_b}$ could otherwise be expressed as the friction force $F_f$ for the wheel in the front f left l in the direction of $\hat{e}_b$. Likewise, the normal force $F_{Nrr}$ corresponds to the normal force $F_N$ applied to the rear r right r wheel of the mechanical propulsion system 402. These friction and normal forces acting on the mechanical propulsion system 402 all occur at the points of contact between the wheels and the multi-oriented surface 420 which may extend further away from the center of gravity than the edge of the body 401, here the distance from the point of contact and the axis of rotation about the center of gravity 410 would be half the distance of L and half the distance of W. These distances are important to consider possible tipping of the crawler drone 400 across the entire range of slope angles θ of the multi-oriented surface 420.

As illustrated, the crawler drone 400 is traveling in the direction $\hat{e}_t$ along the multi-oriented surface 420 having a slope of angle θ. This represents a heading angle φ of ninety degrees whereas a heading angle φ of zero degrees would correspond to directly up the slope θ of the multi-oriented surface 420. Likewise, a heading angle φ of one hundred and eighty degrees would correspond to directly down the slope θ of the multi-oriented surface 420. In addition, internal forces resisting the change in movement of the crawler drone 400 have been accounted for and represented by $F_I$.

Figure 5:
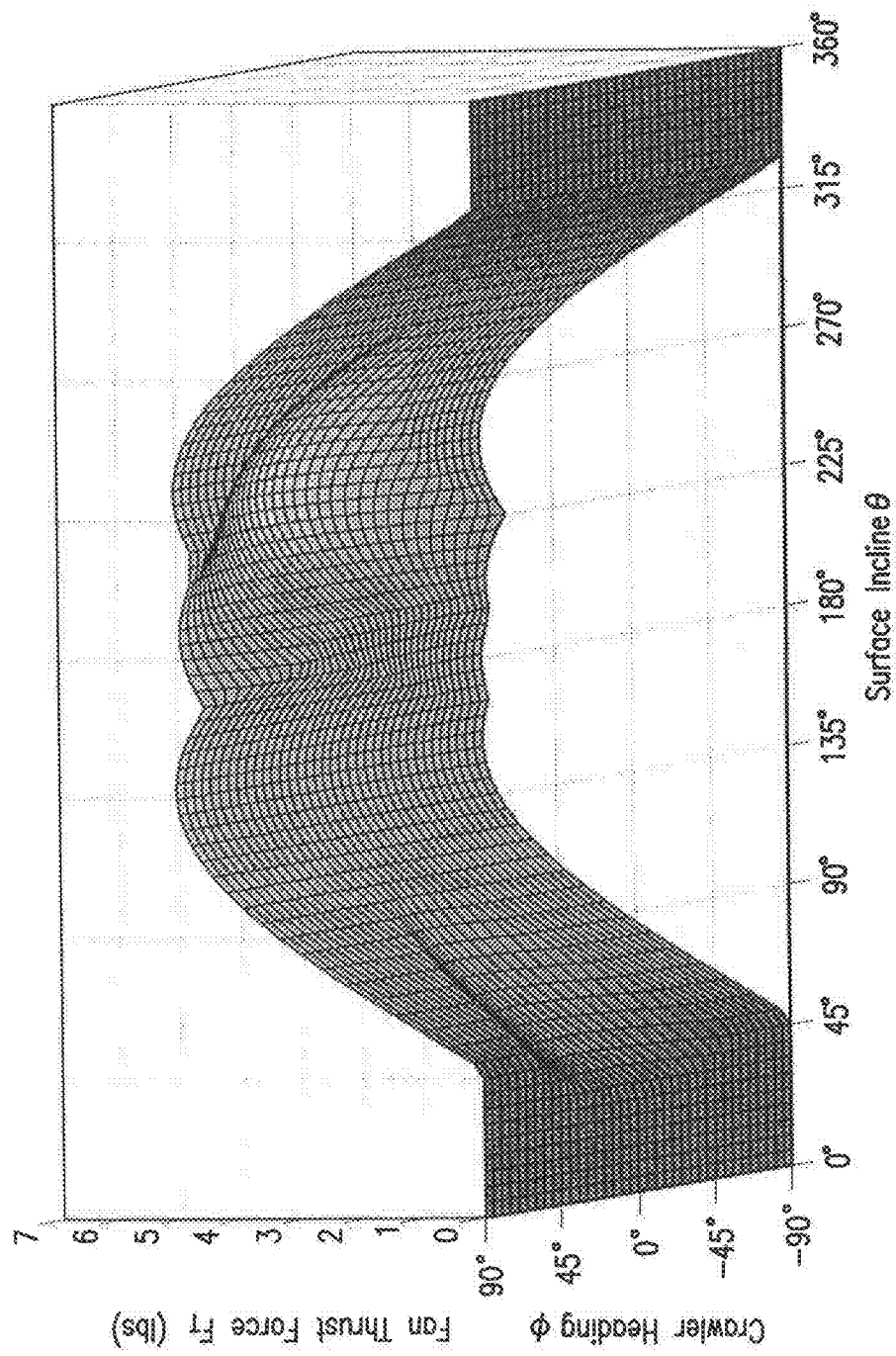
FIG. 5 illustrates the minimum thrust force necessary across the entire range of; surface orientations and headings to ensure that an example crawler drone may adhere to the multi-oriented surface without failing, sliding, or tipping.

FIG. 5 is a chart where the surface represents the minimum thrust force necessary for an example crawler drone such as the one illustrated in FIG. 1 that undergoes the set of forces applied to it as described with respect to FIG. 4. This chart plots the thrust force required to be produced by the thrust system 104 along the vertical axis. Along the other two axes are the angle of slope θ or surface incline of the multi-oriented surface 120 and the heading angle φ of the crawler across the entire range of surface orientations and headings. Any thrust force of a magnitude greater than that indicated by the surface of the plot should be sufficient to ensure that the crawler drone 100 remains adhered to the multi-oriented surface 100 without falling, sliding, or tipping at the particular heading φ and slope θ. It is recognized, however, that a greater thrust force may consume energy reserves at a greater rate and may further impart an undesirably-large force on the multi-oriented surface 120 in certain instances.

This insight may be used to control the instantaneous thrust force to allow for some safety margin but not overconsume energy reserves, thus prolonging the duration that a crawler drone 100 may perform its operations. Furthermore, the thrust force may be controlled in relation to the normal force that would be applied to the multi-oriented surface 100 to prevent damage during the course of performing the operations of the crawler drone 100. This insight may further be used to pre-compute an ideal path or course for a crawler drone 100. For example, the crawler drone 100 may have a path that operates in a predominately inverted orientation to begin with while the power reserves or battery of crawler drone is at its maximum and then move to less-steep orientations as the power reserves are depleted where the energy expenditure would be less strenuous. Where multiple crawler drones 100 are employed as platoons or in a fleet the amount of operations to be performed in areas that require greater thrust forces may be more efficiently spread among the number of crawler drones 100. These considerations and others may be programed or computed by the controller 106 either at the outset or may be dynamically calculated and communicated with other crawler drones 100 or human operators.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A device comprising:
a body;
a mechanical propulsion system affixed to the body, the mechanical propulsion system comprising a plurality of wheels and at least one motor coupled to the plurality of wheels, wherein the mechanical propulsion system is configured to:
cause the body to traverse a multi-oriented surface; and
prevent contact between the body and the multi-oriented surface;
a ducted fan configured to apply a thrust force to the device, wherein the thrust force opposes a gravitational force acting on the device;
a suspension system affixing the mechanical propulsion system to the body, the suspension system comprising a plurality of actuators configured to:
lift the body of the device over a protrusion of the multi-oriented surface;
adjust the orientation of the body; and
raise and lower each of the plurality of wheels with respect to the body in order to maintain contact between the mechanical propulsion system and the multi-oriented surface; and
a payload comprising at least one sensor configured to detect one or more characteristics associated with the multi-oriented surface.

2. The device of claim 1, wherein the ducted fan is further configured such that a magnitude of a vertical component of the thrust force exceeds the gravitational force.

3. The device of claim 1, wherein the ducted fan comprises a plurality of control vanes configured to:
control the direction of the thrust force; and
cause the thrust force to act upon a point on the device, with respect to a center of gravity of the device.

4. The device of claim 1, wherein the suspension system is further configured to adjust the orientation of the body such that the direction of the thrust force is more incidental to the direction of the gravitation force.

5. The device of claim 1, wherein the suspension system is further configured to adjust the orientation of the body such that the direction of the thrust force is more opposed to the direction of slide of the mechanical propulsion system.

6. The device of claim 1, wherein the ducted fan is further configured to control the thrust force so as to cause the suspension system to adjust the orientation of the body.

7. The device of claim 1, wherein the suspension system is further configured to raise the body to a distance away from the multi-oriented surface in response to a topology of the multi-oriented surface.

8. The device of claim 1, wherein the ducted fan is further configured to lessen a vacuum pressure resultant on the multi-oriented surface.

9. The device of claim 1, wherein the payload comprises at least one of a visual-spectrum camera, an infrared camera, a thermal camera, a laser scanner, an X-ray module, and an ultrasonic non-destructive testing module.

10. The device of claim 1, further comprising a marking device configured to mark a defect of the multi-oriented surface.

11. A system for detecting characteristics associated with a multi-oriented surface comprising:
- at least one device, wherein each of the at least one device comprises:
    - a body;
    - a mechanical propulsion system affixed to the body, the mechanical propulsion system comprising a plurality of wheels and at least one motor coupled to the plurality of wheels, wherein the mechanical propulsion system is configured to:
        - cause the body to traverse a multi-oriented surface; and
        - prevent contact between the body and the multi-oriented surface;
    - a ducted fan configured to apply a thrust force to the at least one device, wherein the thrust force opposes a gravitational force acting on the at least one device;
    - a suspension system affixing the mechanical propulsion system to the body, the suspension system comprising a plurality of actuators configured to:
        - lift the body of the device over a protrusion of the multi-oriented surface;
        - adjust the orientation of the body; and
        - raise and lower each of the plurality of wheels with respect to the body in order to maintain contact between the mechanical propulsion system and the multi-oriented surface; and
    - at least one sensor configured to detect characteristics associated with the multi-oriented surface; and
    - a controller configured to control the at least one device and further configured to detect one or more characteristics associated with the multi-oriented surface based at least in part on the at least one sensor.

12. The system of claim 11, wherein at least one device further comprises at least one tool.

13. The system of claim 12, wherein the tool comprises at least one of a paint applicator, a sealant applicator, a glue applicator, a sanding apparatus, a deburring apparatus, a cutting apparatus, a welding apparatus, a rivet applicator, a marker, a sticker applicator, a repair tool, and a tool delivery system.

14. A method of detecting characteristics comprising:
traversing a multi-oriented surface with at least one device, the at least one device comprising:
- a body;
- a mechanical propulsion system affixed to the body, the mechanical propulsion system comprising a plurality of wheels and at least one motor coupled to the plurality of wheels, wherein the mechanical propulsion system is configured to:
    - cause the body to traverse the multi-oriented surface; and
    - prevent contact between the body and the multi-oriented surface; and
- a ducted fan configured to apply a thrust force to the at least one device, wherein the thrust force opposes a gravitational force acting on the at least one device;
- a suspension system affixing the mechanical propulsion system to the body, the suspension system comprising a plurality of actuators configured to:
    - lift the body of the device over a protrusion of the multi-oriented surface;
    - adjust the orientation of the body; and
    - raise and lower each of the plurality of wheels with respect to the body in order to maintain contact between the mechanical propulsion system and the multi-oriented surface; and
detecting, by at least one sensor, one or more characteristics associated with the multi-oriented surface.

15. The method of claim 14, wherein the step of traversing the multi-oriented surface with at least one device further comprises directing by at least one of manual control, semi-autonomous control, and autonomous control.

16. The method of claim 15, wherein the step of directing further comprises communicating to the at least one device by at least one of a tethered wire and a wireless communications protocol.

17. The method of claim 15, wherein the step of directing is determined based at least in part on a path selected to reduce energy expenditure by at least one of the mechanical propulsion system and the thrust system.

18. The method of claim 14, further comprising responding to the one or more characteristics, wherein responding comprises at least one of painting, gluing, sealing, sanding, deburring, cutting, welding, riveting, marking, repairing, and applying a sticker.

* * * * *